(12) United States Patent
Mascaro

(10) Patent No.: US 10,846,431 B2
(45) Date of Patent: Nov. 24, 2020

(54) SYSTEM AND METHOD FOR STORING DATA USED BY BREACH DETECTION SYSTEMS

(71) Applicant: First Data Corporation, Greenwood Village, CO (US)

(72) Inventor: Christopher M. Mascaro, Washington, DC (US)

(73) Assignee: First Data Corporation, Greenwood Village, CO (US)

( * ) Notice: Subject to any disclaimer, the term of this patent is extended or adjusted under 35 U.S.C. 154(b) by 191 days.

(21) Appl. No.: 15/954,186

(22) Filed: Apr. 16, 2018

(65) Prior Publication Data

US 2019/0318126 A1 Oct. 17, 2019

(51) Int. Cl.
| | |
|---|---|
| G06F 21/62 | (2013.01) |
| H04L 29/06 | (2006.01) |
| G06F 21/00 | (2013.01) |
| G06F 16/9535 | (2019.01) |
| G06Q 40/02 | (2012.01) |

(52) U.S. Cl.
CPC ...... *G06F 21/6263* (2013.01); *G06F 16/9535* (2019.01); *H04L 63/1416* (2013.01); *G06Q 40/02* (2013.01)

(58) Field of Classification Search
CPC ............ H04L 63/1416; G06F 21/6263; G06F 16/9535; G06Q 40/02
See application file for complete search history.

(56) References Cited

U.S. PATENT DOCUMENTS

| | | | |
|---|---|---|---|
| 8,600,872 B1 | 12/2013 | Yan | |
| 10,523,686 B1 * | 12/2019 | Mehta | H04L 63/102 |
| 2009/0248581 A1 | 10/2009 | Brown | |
| 2009/0300589 A1 * | 12/2009 | Watters | G06Q 40/00 717/140 |
| 2011/0154467 A1 | 6/2011 | Bomar et al. | |
| 2011/0247062 A1 * | 10/2011 | Zon | H04L 9/3226 726/6 |
| 2013/0263226 A1 * | 10/2013 | Sudia | H04L 63/1466 726/4 |
| 2014/0032419 A1 | 1/2014 | Anderson et al. | |
| 2014/0052999 A1 | 2/2014 | Aissi | |

(Continued)

OTHER PUBLICATIONS

International Search Report and Written Opinion dated Jul. 2, 2019 in related foreign application No. PCT/US2019/027630, 15 pgs.

*Primary Examiner* — Mohammad A Siddiqi
(74) *Attorney, Agent, or Firm* — Kilpatrick Townsend & Stockton LLP

(57) ABSTRACT

A system for detecting breach of merchant systems includes an extraction management system for extracting wildcard data from a dump site at which stolen account data is offered for sale. The system also includes an account breach identifying system for accessing stored transaction data from multiple banks and merging the extracted dump site data with the transaction data to create unique PAN (primary account number) data records (each set of wildcard data corresponds to only a single PAN) and multiple PAN data records (each set of wildcard data corresponds to multiple PANs). The unique and multiple PAN data records are stored and analyzed separately, and reduce the amount of data needed to identify a breached merchant.

18 Claims, 10 Drawing Sheets

(56) References Cited

U.S. PATENT DOCUMENTS

| | | |
|---|---|---|
| 2017/0024828 A1 | 1/2017 | Michel et al. |
| 2017/0237759 A1* | 8/2017 | Bell .................... H04L 63/1425 726/23 |
| 2018/0247312 A1* | 8/2018 | Loganathan ........... G06Q 20/32 |
| 2019/0068604 A1* | 2/2019 | Legault .............. G06Q 20/4016 |
| 2019/0180283 A1* | 6/2019 | Unnerstall ......... G06Q 20/4014 |
| 2019/0205885 A1* | 7/2019 | Lim ....................... G06N 5/003 |

* cited by examiner

UNIQUE MATCHES

WILD CARD

| TRXN NO | TRXN ID | DATE | PAN | MERCHANT NAME | MERCHANT LOCATION | BIN | LAST 4 | EXP | BREACH LOCATION | DUMP SHOP NAME |
|---|---|---|---|---|---|---|---|---|---|---|
| 1 | 02147525680778 | 040117 | 5736432875423557 | ACME SPEC | DAYTON, OH | 573643 | 3557 | 0321 | DAYTON, OH | SINISTER |
| 2 | 37564728182234 | 042017 | 5736432875423557 | TREXS | DAYTON, OH | 573643 | 3557 | 0321 | DAYTON, OH | SINISTER |
| 3 | 82652617071123 | 043017 | 5736432875423557 | RICBE | DAYTON, OH | 573643 | 3557 | 0321 | DAYTON, OH | TORQUI |
| 4 | 74311506160012 | 051217 | 5736432875423557 | CYBFLO | DAYTON, OH | 573643 | 3557 | 0321 | DAYTON, OH | TORQUI |
| 5 | 11237890167411 | 021817 | 4321752891127476 | SALLY B | FAIRFAX, VA | 432175 | 7476 | 1019 | PITTSBURGH, PA | TORQUI |
| 6 | 47533617071136 | 033017 | 4321752891127476 | ACME SPEC | DAYTON, OH | 432175 | 7476 | 1019 | DAYTON, OH | TORQUI |
| 7 | 43272182722172 | 050217 | 4321752892381722 | ACME SPEC | DAYTON, OH | 432175 | 1722 | 0620 | DAYTON, OH | BUSTED |
| 8 | 56431197541121 | 041217 | 4753613372411132 | SAMMY B | TEMPE, AZ | 475361 | 1132 | 0218 | DAYTON, OH | BUSTED |
| 9 | 42459784478768 | 041017 | 4753613372411132 | ACME SPEC | DAYTON, OH | 475361 | 1132 | 0218 | DAYTON, OH | BUSTED |
| 10 | 21234756225654 | 031517 | 5921714431745326 | ACME SPEC | DAYTON, OH | 592171 | 5326 | 0119 | DAYTON, OH | TORQUI |
| 11 | 76422506960032 | 022117 | 5921714431745326 | FULLTON | DAYTON, OH | 592171 | 5326 | 0119 | DAYTON, OH | TORQUI |
| ... | | | | | | | | | | |
| N | 07534337218947 | 080716 | 4753212275891178 | BILL SHOP | KOKOMO, IN | 475321 | 1178 | 1121 | ATLANTA, GA | SINISTER |

FIG. 3A

MULTIPLE MATCHES        WILD CARD

| TRXN NO | TRXN ID | DATE | PAN | MERCHANT NAME | MERCHANT LOCATION | BIN | LAST 4 | EXP | BREACH LOCATION | DUMP SHOP NAME |
|---|---|---|---|---|---|---|---|---|---|---|
| 1 | 0756433721894 7 | 030717 | 5736227465893410 | SILVER S | BOSTON, MA | 573622 | 3410 | 0118 | BOSTON, MA | SINISTER |
| 2 | 4821733262550 1 | 122916 | 5736226354783410 | MELS B | DAYTON, OH | 573622 | 3410 | 0118 | DAYTON, OH | SINISTER |
| 3 | 3751624151431 0 | 013017 | 5736225233673410 | SILVER S | BOSTON, MA | 573622 | 3410 | 0118 | BOSTON, MA | TORQUI |
| 4 | 2640513040320 9 | 033017 | 5736224122563410 | ACME SPEC | DAYTON, OH | 573622 | 3410 | 0118 | DAYTON, OH | SINISTER |
| 5 | 4822735060342 1 | 031517 | 5736224122563410 | SIMPLIS | DAYTON, OH | 573622 | 3410 | 0118 | DAYTON, OH | SINISTER |
| 6 | 1543211610783 6 | 090116 | 4321756897525731 | SAM GOOD | CONCORD, NH | 432175 | 5731 | 1119 | SALEM, MA | TORQUI |
| 7 | 4721500562672 1 | 010517 | 4321754786385731 | MELS B | DAYTON, OH | 432175 | 5731 | 1119 | DAYTON, OH | SINISTER |
| 8 | 9562155371461 0 | 101416 | 4321572664315731 | GV HARDN | SELMA, AL | 432175 | 5731 | 1119 | SELMA, AL | SINISTER |
| 9 | 1867544832905 8 | 010717 | 4321572664315731 | ACME SPEC | DAYTON, OH | 432175 | 5731 | 1119 | DAYTON, OH | SINISTER |
| ... | | | | | | | | | | |
| N | 8427301431561 0 | 031417 | 4753212275891178 | SIMPLE S | GROVE, WI | 475321 | 1178 | 0122 | GROVE, WI | BUSED |

FIG. 3B

SYSTEM AND METHOD FOR STORING DATA USED BY BREACH DETECTION SYSTEMS

BACKGROUND OF THE INVENTION

Compromised customer account data (such as from breach of data stored in merchant and other systems) has a substantial economic impact. Credit card and other financial companies bear loss when the compromised data is used to conduct fraudulent transactions. Customers experience aggravation and sometimes loss when their account data is stolen. A merchant system may store customer account data (from credit card and similar accounts) representing large numbers of accounts (e.g., when the merchant conducts many transactions each day), and thus a single system breach can have widespread impact.

Prior systems for identifying compromised data and breaches of systems typically relied on the occurrence of fraudulent transactions (use of the compromised data by a fraudster) and then analyzed very large volumes of transactions at retailers to determine a common point-of-purchase. For example, once multiple breached accounts are identified (from fraudulent or possible fraudulent transactions), every transaction using an identified account is evaluated against transactions using other identified accounts to find a common merchant where the accounts were used. A determined common-point-of purchase may be able to identify both the merchant where the breach occurred and specific accounts that were compromised.

These prior systems have technical disadvantages and obstacles, given the huge amounts of data that need to be sorted through (to be effective, they often need to access and evaluate virtually the entire universe of transactions). They have the further disadvantage of only identifying a breach after a fraudulent transaction has occurred. Thus, such systems are expensive to implement (given the huge amounts of data that need to be accessed and analyzed) and only operate after-the-fact when fraud has occurred, rather than identifying breaches proactively before a fraudulent transaction has been attempted.

There has thus arisen the need for systems to identify compromised accounts that are less expensive (e.g., do not need to access and sort through the same vast amounts of data as in prior systems) and that can identify data breaches or compromises more quickly and before the compromised data is used by fraudsters.

BRIEF SUMMARY OF THE INVENTION

There is provided, in accordance with embodiments of the invention, a database system and method for organizing data records in order to detect and identify a system, such as a merchant system, that has been breached or compromised.

In described embodiments, data records are generated by merging transaction data relating to accounts from multiple institutions and data from a dump site (a website at which compromised account data is offered for sale) into two types of merged data records, namely, a unique PAN data record and a multiple PAN data record. The unique PAN data record is one in which only a single account corresponds to partial account data (wildcard data) appearing at the dump site. The multiple PAN data record is one in which multiple accounts correspond to the wildcard data appearing at the dump site. The unique PAN data records and a multiple PAN data records are stored in separate databases and evaluated separately to identify a breached system.

In one embodiment, a database system for storing data used in detecting breach of a computer system includes a multi-institution database for storing transaction data relating to transactions conducted against accounts at multiple financial institutions; an extracted database for storing extracted data retrieved from dump sites where dump site data relating to compromised accounts is offered for sale over the Internet, the extracted data including at least (1) sets of wildcard data that each only partially identifies a primary account number (PAN) of a compromised account and (2) compromise location data identifying the location of compromise; a unique PAN database for storing a unique PAN data set, the unique PAN data set received from a breach identifying system; and a multiple PAN database for storing a multiple PAN data set, the multiple PAN data set received from the breach identifying system. The breach identifying system: retrieves (1) transaction data stored at multi-institution database and associated with transactions conducted against accounts maintained at the multiple financial institutions, the transaction data including merchant name data identifying a name of a merchant associated with a corresponding transaction and merchant location data identifying a location of the merchant and (2) extracted data stored at the extracted database, and merges the transaction data and extracted data into the unique PAN data set and the multiple PAN data set that include a plurality of data records that each correspond to a transaction, with the unique PAN data set including, for each data record, transaction data for the corresponding transaction and extracted data associated with an account that is uniquely identified by the wildcard data and that is used for the corresponding transaction, and the multiple PAN data set including, for each data record, transaction data for the corresponding transaction and extracted data associated with one of multiple different accounts that are all identified by the wildcard data, with the one of the multiple accounts used for the corresponding transaction.

BRIEF DESCRIPTION OF THE DRAWINGS

FIG. 3A is an example of data records stored in the unique PAN database.

FIG. 3B is an example of data records stored in the multiple PAN database.

DETAILED DESCRIPTION OF THE INVENTION

Figure 1:
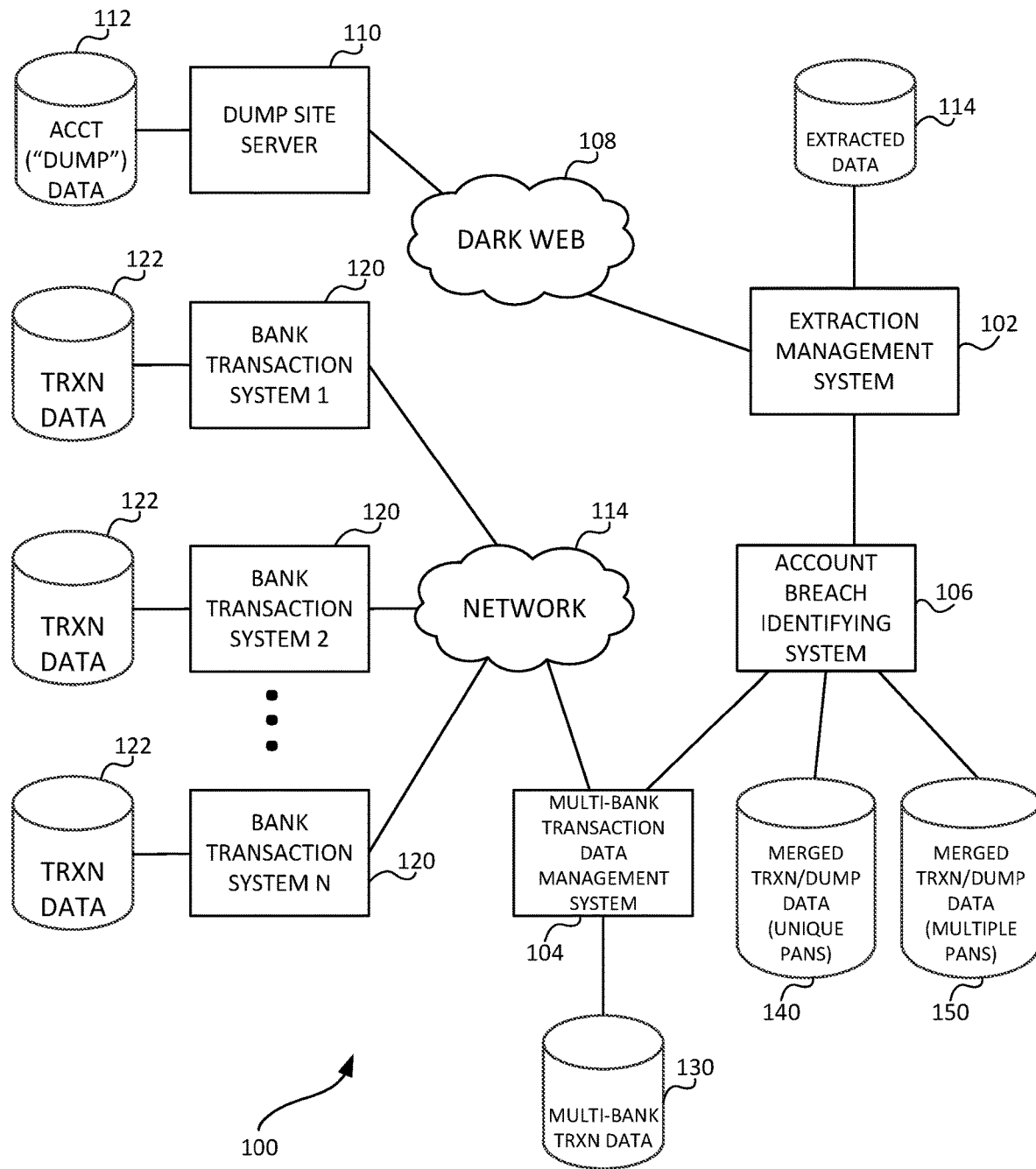
FIG. 1 is a general block diagram showing a system in which a breach of accounts at any of multiple financial institutions is detected.

There are various embodiments and configurations for implementing the present invention. Generally, embodiments provide systems and methods for identifying account data that has been stolen or compromised and offered for sale. Such data is offered on the portion of the Internet that is often referred to as the "Dark Web," which cannot be accessed with common browsers, but rather require the use of special encryption tools and browsers that reveal the website, but conceal the true source, location and identity of the site.

Site operators that offer compromised account data reveal enough information concerning the account data for a prospective purchaser (such as a fraudster that will subsequently use the account data to conduct a fraudulent transaction) to determine if they are interested in purchasing the account data. However, the revealed information is only partial account information and not complete enough to use for a transaction. These sites take account data from a large number of accounts that have been breached or compromised, and download or "dump" the partial account data at the sites for viewing. Hence, these sites offering account data are often referred to as "dump" sites, and the data appearing on the sites is often referred to as "dumps."

Dump sites present the partial account data and, if a purchaser is interested and makes payment, the complete account data is sent to the purchaser. Typically, dump sites offer some or all of the following types of partial account information:

Bank Identification Number (BIN)—the first few digits (typically 6 digits) of a primary account number (PAN, typically 16 digits in total) that identifies the bank or financial institution maintaining the account;

Last 4 Digits—the last 4 digits of the PAN which can provide sufficient identification of the account at the site, but is not enough to conduct a transaction;

Expiration Date—the expiration date (month and year) that is associated with the card that a cardholder uses to conduct a transaction against the account;

Breach Location—in the US, this is typically the city and state where a merchant or other system has been breached (typically, this is the location of a POS terminal or local server where a legitimate transaction was conducted by a cardholder, and which was subsequently breached). This information is useful to a fraudster since it reflects a geographical area where a cardholder resides or is likely to conduct transactions, and makes a transaction in that area less likely to be identified as fraudulent.

In one embodiment, the above types of information offered at dump sites are used in conjunction with collected transaction information to create two different types of merged data sets that can be stored and subsequently analyzed to determine a common-point-of purchase, and from that to identify a compromised account and the merchant location where the compromise occurred. Ultimately, a "window of exposure" (a time period during which the breach likely occurred) can be determined for the merchant, thereby permitting banks to identify other accounts that may have been breached because of transactions conducted at the same merchant location during the window of exposure, even if those accounts are not being offered at a dump site.

In implementing embodiments of the invention, dump sites are accessed and the partial account data from the sites is extracted and stored. Separately, transaction data from multiple banks (e.g., banks that are interested in identifying their accounts that may have been compromised) is collected and stored. An account breach identifying system processes the extracted dump site data and the transaction data in order to create merged data records where the partial account data (referred to herein as "wildcard data") and related transaction data are assembled into the merged data records. The merged data records are then analyzed to identify a complete account number and a merchant where a breach may have occurred.

In described embodiments, the extracted dump site data and multi-bank transaction data are merged into two different types of data records. These two types of data records may have the same format. They both may include: a transaction ID for a specific transaction, a transaction date, the PAN used in the transaction, a merchant name (for the transaction), a merchant location (for the transaction), a BIN (for the PAN used in the transaction), the last 4 digits of that PAN, the expiration date of the associated card, a breach location, and the name of the dump site (sometimes also referred to as the "dump shop") that has offered the partial account information.

In described embodiments, one of the two types of data records is referred to as a "unique" PAN data record and the other is referred to as a "multiple" PAN data record. A unique PAN data record is one for which the partial account data from the dump site, when analyzed in conjunction with the multi-bank transaction data, corresponds to a single account number or PAN. For example, if the BIN, last 4 digits (of the PAN) and an expiration date (collectively the wildcard data) only match to a single account that has been used in transactions represented by the multibank transaction data, then each unique PAN data record merges the dump site data (including wildcard data) matching that single account and one of each transaction that has been conducted with that account.

A multiple PAN data record is one for which the partial account data from the dump site may correspond to multiple, possible account numbers or PANs (any one of which may the actual compromised PAN). For example, if the BIN, last 4 digits (of the PAN) and an expiration date (collectively the wildcard data) match to multiple different accounts (any one of which could be the account for which data is being offered on the dump site), then each multiple PAN data record merges the dump site data (including wildcard data) matching those multiple accounts with one of each transaction that has been conducted against those same accounts.

The actual content of the merged data records will be better understood by referencing specific examples of unique PAN data records and multiple PAN data records, which will be described later in conjunction with FIGS. 3A and 3B.

The unique PAN data records and the multiple PAN data records are stored separately, in different databases (e.g., a unique PAN database and a multiple PAN database). As will also be described later, the use of separate databases permits the two types of data records to be analyzed separately and in different ways to more efficiently identify a common-points-of purchase and breached accounts, and thus provide an technical improvement over current systems that are used to identify systems that have been breached.

Referring now to FIG. 1, a network 100 according to one embodiment of the invention is illustrated. Systems within the network 100 for carrying the features of the invention include a extraction management system 102, a multi-bank transaction data management system 104, and an account breach identifying system 106.

The extraction management system 102 manages the access and extraction, over the dark web 108, of information from a site managed by a dump site server 110, where compromised account data is stored in a memory or database 112 (and displayed for sale at the dump site). The extraction management system 102 extracts dump site data that can be used for identifying compromised accounts and stores that extracted data at an extracted database 114.

The transaction data management system 104 receives transaction data from a plurality of bank transaction systems 120 (over a network 114, e.g., a private network or the internet). Each system 120 provides access to transaction data stored in one of a plurality databases 122. For example, each database 122 may store transaction data for accounts maintained at a bank associated with that database 122. The accessed transaction data from each of the banks is stored by the transaction data management system 104 in a multi-bank transaction database 130.

As will be described in greater detail later, the breach identifying system 106 retrieves data from the extracted database 114 and the multi-bank transaction database 130, and merges the data into data records that are then stored in a unique PAN database 140 and a multiple PAN database 150. The breach identifying system 106 separately analyzes the data records in the databases 140 and 150 in order to identify compromised accounts (and a merchant whose system has been breached), and notifies banks whose accounts have been compromised (as well as the merchant).

Figure 2A:
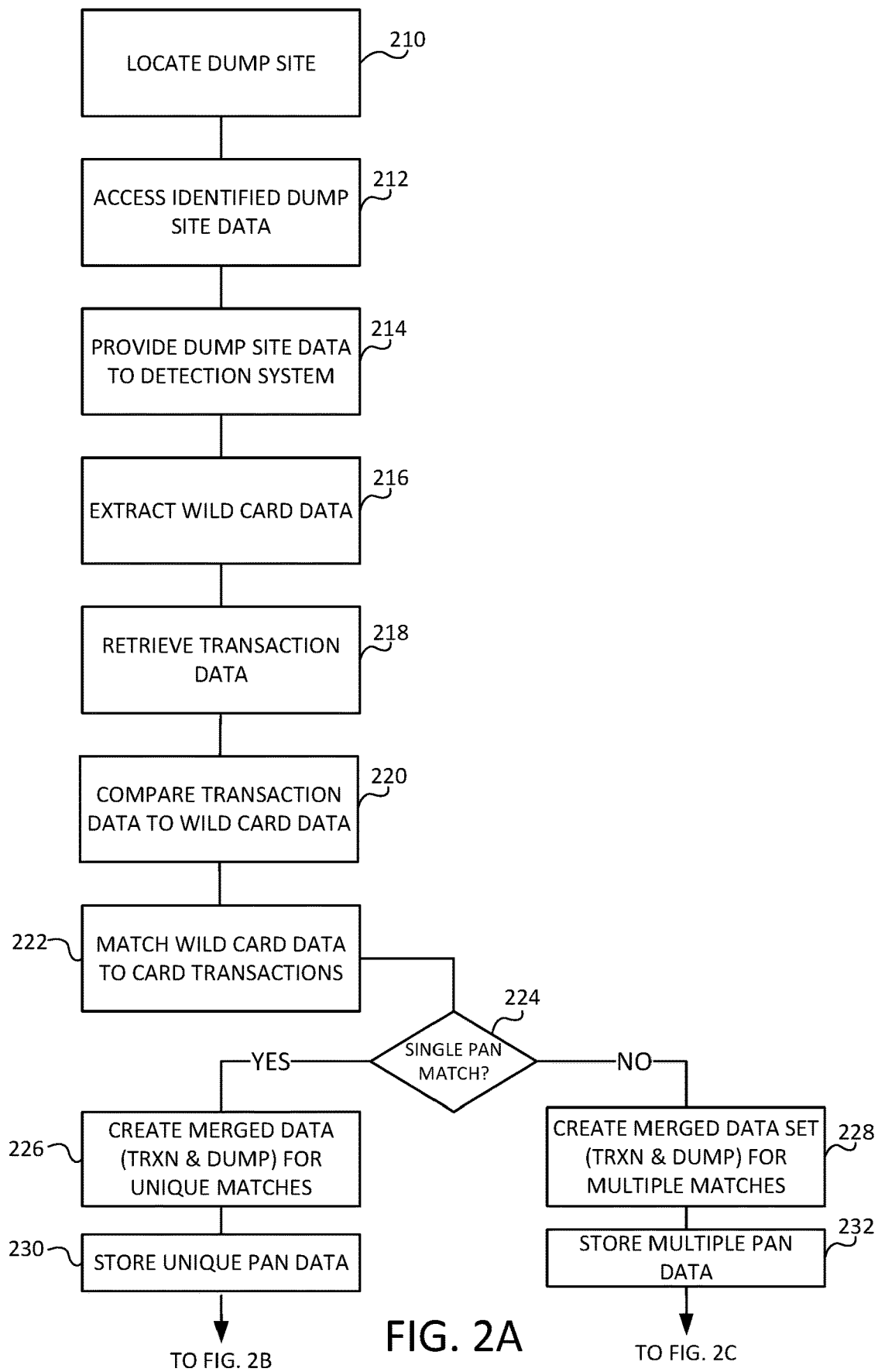
FIG. 2A is a flow diagram illustrating a process implemented at the extraction management system and the account breach identifying system of FIG. 1, for accessing dump site data, extracting dump site data, and creating two merged data sets that are stored at a unique PAN database and a multiple PAN database.
Figure 2B:
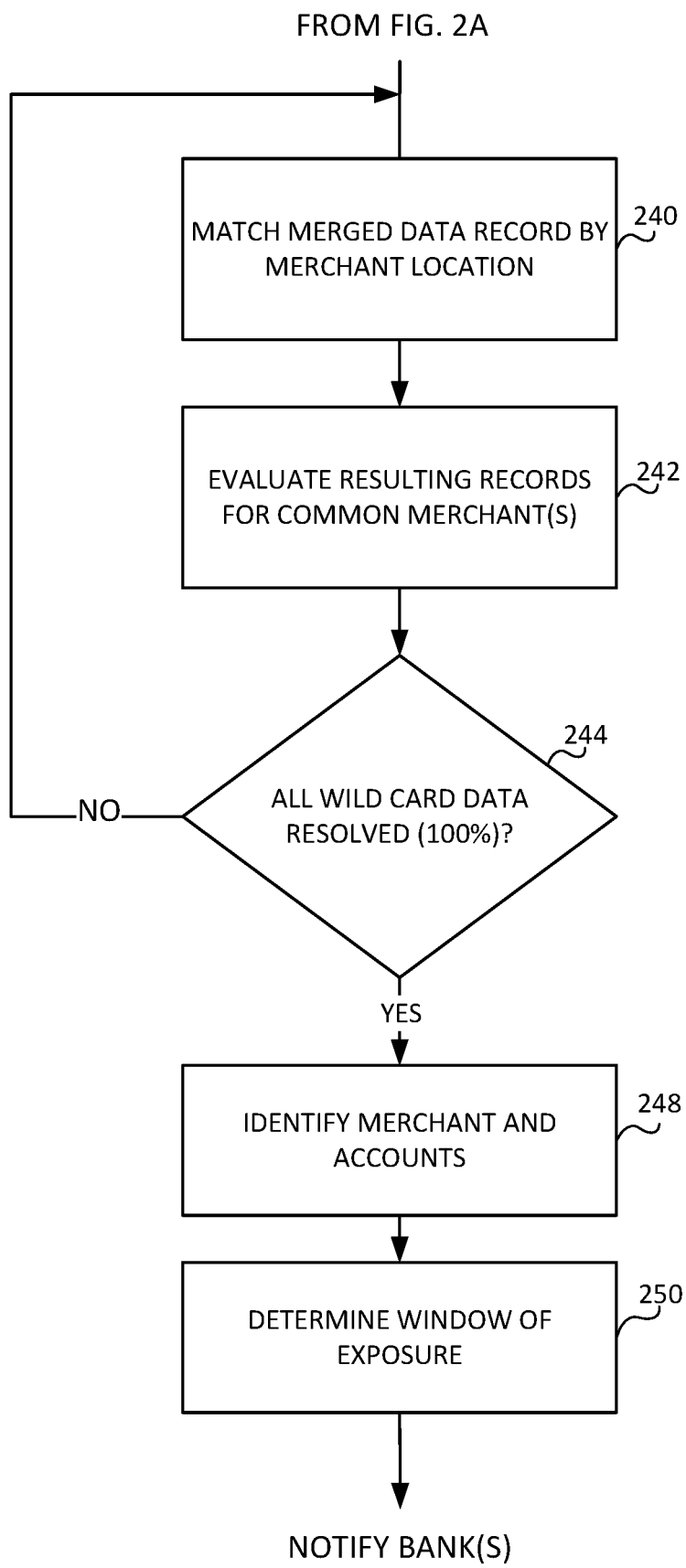
FIG. 2B is a flow diagram illustrating the processing of data records stored in the unique PAN database for identifying breached accounts.
Figure 2C:
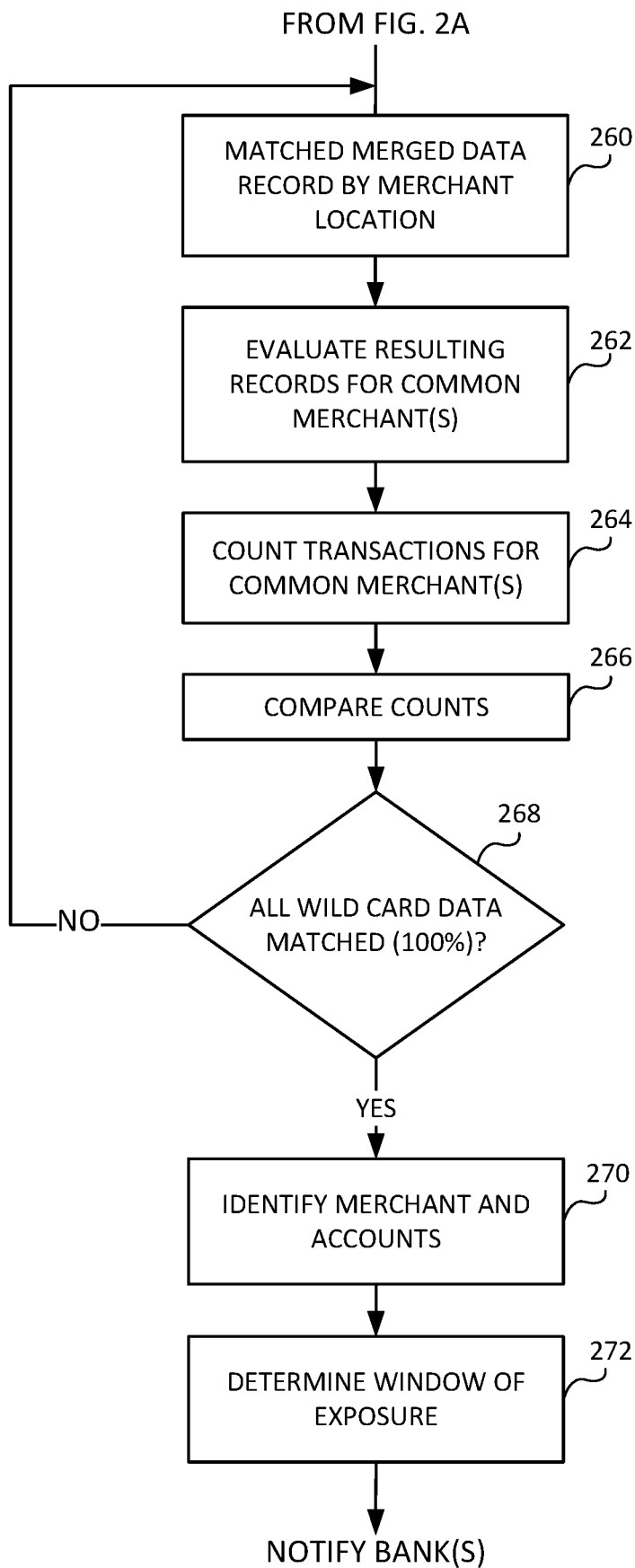
FIG. 2C is a flow diagram illustrating the processing of the data records stored in the multiple PAN database for identifying breached accounts.

Referring now to FIGS. 2A, 2B and 2C, there is illustrated an overall process according to one embodiment for detecting the breach of a system (such as a merchant system), using the extraction management system 102 and breach identifying system 106 seen in FIG. 1.

At step 210, a "dump site" is located, at which stolen card data ("dumps") is offered for sale over the dark web 108. At any given time, there may be several dozen primary dump sites accessible through the dark web, having card data that has been stolen by a hacker. Typically the stolen card data is hacked at a local server or terminal of a merchant (e.g., a server at a merchant store in a chain of stores). Such local servers may become vulnerable by the introduction of malware, e.g., at a terminal at the store, and once introduced, results in account data being "scraped" and transmitted to the hacker. Data can also be hacked by a skimmer installed at a merchant card reader (which relays the card information to the hacker). The hacker stealing the data then offers the data for sale, e.g., either by selling the stolen data at its own dump site or selling the data to a third party that operates the dump site at the dump site server 110.

Generally, financial companies and law enforcement will be made aware of dump sites from monitoring the dark web, and the identity (and URL) of the dump site is provided to the extraction management system 102. In some cases, the dump sites may be operated for a short period of time, but in other cases they may operate for long periods of time without interference, due to their anonymity and the uncertainty about where they are located.

The entity operating the extraction management system 102 and account breach identifying system 106 will identify and locate dump sites by their URLs at step 210, and program the extraction management system 102 to periodically access the identified dump site and retrieve stolen dump site data, at step 212. This can be done through the use of "web scrapers" that access and retrieve data from website servers. The operators of dump sites will often attempt to protect their site from scraping, and a process will be described later (in conjunction with FIG. 4) for use in scraping data from a dump site with a reduced chance that the dump site operator will know that its data is being scraped.

The retrieved dump site data may also include a base (database) name representing the data base methodology by which data has been uploaded by the hacker to the dump site.

The retrieved dump site data is stored at the extracted database 114. For example, at any given point in time, the extracted database 114 may store all dump site data that has been retrieved from each of the dump sites that are known by the operator of the system (and when specific breached merchant locations have not yet been identified). As described earlier, the data retrieved from the dump site will include partial account data posted at the dump site (e.g. BIN, last 4 digits of an account number, and the expiration date of the card), and further information, such as the breach location. This information, along with, e.g., the dump shop name, are stored at the database 114. As noted earlier, the breach location is of particular usefulness to fraudsters, because it typically identifies the location of the local server that was breached, and thus would indicate the general geographical area where a cardholder (associated with the stolen data) may be shopping. A fraudster using the stolen card data in that area is more likely to be able to conduct transactions that will not be identified as potentially fraudulent.

In the process illustrated in FIG. 2A, the operator of the breach identifying system 106 will periodically request dump site data that is held in the extracted database 114, and such data is provided to the breach identifying system at step 214. The system 106 extracts data from each data record in the dump site data at database 114, including "wildcard" data that pertains to each account posted at the dump site, step 216. The wildcard data, in the present embodiment, is the BIN, last 4 digits (of the account number) and the card expiration date. At the same time, the breach identifying system 106 will access transaction data stored at database 130 (managed by the transaction data management system 104) and retrieve transaction data, at step 218, for comparison with wildcard data.

As should be evident, the transaction data for any given transaction includes, among other things, a transaction ID, a date of the transaction, the account number or PAN used for the transaction, the expiration date of the card associated with the account number, and the name and location of the merchant where the transaction was conducted. Typically the retrieved transaction data will be for transactions over a specified period of review, for example, 12 months prior to the date of retrieval. However the specified time period may be longer or shorter, depending on how much data the system operator would like to use, which may in turn depend on how recent the dump site data appears to be.

The wildcard data and the transaction data are compared in order to identify any transaction conducted with a card account that has a BIN, last 4 digits, and card expiration date that matches the wildcard, step 222. It should be appreciated that this matching of wildcard data may or may not necessarily identify a specific card number.

For example, in some cases, a wildcard data set will, in fact, match a single card account that appears in the transaction data. This occurs when the BIN, last 4 digits of the PAN and the expiration date of the card match only one card that has been used for transactions conducted during the review period, e.g., the preceding 12 months. Typically, this will be true for only some wildcard data sets, perhaps 10-20%, though although this may vary depending on the number of active PANs and the frequency of use of cards by individual cardholders.

In other cases (perhaps for 80% of the wildcard data sets), any given wildcard data set will match multiple card accounts that appear in the transaction data for the review period. Whether there is a single PAN match or not (step 224) will determine how the data is to be analyzed for identifying a breached account. If there is a single PAN matched, then a merged data record is created for each transaction with the uniquely identified single PAN match (step 226). If there is not a single PAN match (multiple card accounts appearing in the transaction data match the wildcard data), then a merged data record is created for each transaction against the matched multiple accounts (step 228).

The creation of merged data records offers significant operational advantages to the breach identifying system 106 in identifying breached accounts. Rather than examining all available account transactions in finding a common-point-of-purchase, only those transactions matching "wildcard" data are examined as merged data records.

Turning briefly to FIGS. 3A and 3B, examples of data records resulting from the merging of data at steps 226 and 228 are illustrated. FIG. 3A shows examples of data records for unique matches (each wildcard data set matches only a single account being offered at one of the dump sites) and FIG. 3B illustrates data records for multiple matches (each wildcard data set matches two or more accounts, any one of which may be the account being offered at one of the dump sites).

The data records seen in FIGS. 3A and 3B are, as mentioned earlier, "merged" data records containing both data elements from extracted data from the dump sites (including wildcard data) and data from transaction records maintained at the multibank transaction database 130 that match wildcard data.

For unique matches (each wildcard data set identifies a single PAN) seen in FIG. 3A, each merged record consists of a transaction ID, transaction date, PAN, merchant name and merchant location (e.g., city), all taken from the transaction record (from database 130), and a BIN (bank identification number), Last 4 (last 4 digits of an account number), an EXP (card expiration date), breach location and dump shop name from dump site data. In each unique match records, each wildcard data (BIN, Last 4, and EXP) matches a single PAN, and thus in the examples seen in FIG. 3A, transaction nos. 1-4 all relating to transactions for one uniquely matching PAN, transaction nos. 5-6 all relating to a second uniquely matching PAN, transaction no. 7 relating to a third uniquely matching PAN, transaction nos. 8-9 both relating to a fourth uniquely matching PAN, transaction nos. 10-11 relating to a fifth uniquely matching PAN.

As should be appreciated, unique matches will identify specific accounts that have, in fact, been breached. However, the merchant location of the breached system will not be known without further evaluation.

For multiple matches (each wildcard data set identifies more than one PAN) seen in FIG. 3B, each merged record likewise consists of a transaction ID, transaction data, PAN, merchant name and merchant location taken from the transaction record, and a BIN (bank identification number), Last 4 (last 4 digits of an account number), an EXP (card expiration date), breach location and dump shop name taken from dump site data. Since each set of wildcard data identifies more than one PAN in the merged records, in the examples seen in FIG. 3B transaction nos. 1-5 represent transactions against four different PANs that all match one set of wildcard data, and transaction nos. 6-9 represent transactions against three different PANs that all match one set of wildcard data.

It should be noted that the examples given in FIGS. 3A and 3B are created from a relatively small number of representative transactions and, in actual practice, there would likely be many more transactions relating to each matched PAN, given that over a typical review period (e.g., 6 months) many cardholders are likely to have used a credit or debit card a hundred or more times.

While not seen in FIGS. 3A and 3B, in some embodiments the data records may also include the "base name" associated with the data at the dump site.

Returning to FIG. 2A, after the merged data records are created at steps 226 and 228, the unique PAN data records (such as those represented by the examples in FIG. 3A) are stored in the unique PAN database 140 (step 230) and the multiple PAN data records (such as those represented by the examples in FIG. 3B) are stored in the multiple PAN database 150 (step 232). As discussed earlier, it is advantageous to separate the unique PAN data records and the multiple PAN data records for purposes of processing, since the evaluation of those data records for identifying a breach location is different for unique PAN data records and for multiple PAN data records. This is illustrated in FIG. 2B and FIG. 2C, with FIG. 2B representing the evaluation of unique PAN data records and FIG. 2C representing the evaluation of multiple PAN data records.

Referring to FIG. 2B (in conjunction with FIG. 3A), each unique PAN data record is first evaluated to determine whether there is a match of a merchant location (identifying the geographical location where the transaction was conducted, as indicated in the transaction portion of the merged data records) to a breach location (identifying the geographical location where the breach occurred, as indicated by the dump site portion of the merged data record), at step 240. It should be evident, if the merchant location and breach location are not the same, then it is very unlikely that data for the transaction was breached at the merchant location, and that particular merged data record can be excluded from further evaluation. This is illustrated by referring to the specific examples of merged data records seen in FIG. 3A, where the data records for the unique PAN for transaction nos. 1-4 are evaluated to see if merchant locations and breach locations match, and for this particular PAN, all transactions do in fact match indicating that the breach may have occurred at any one of the merchants at those locations and all that data is kept for further evaluation. For transaction nos. 5 and 6 (both having the same unique PAN), transaction no. 5 has a different merchant location and breach location, so that this particular data record can be excluded as indicating source of the breach. Such analysis continues for all the data records, and in the particular example shown in FIG. 3A, transaction numbers 1-4, 6-7, and 9-11 have matching locations, as determined at step 240.

At steps 242 and 244, the system will sort through the remaining data records in order to associate a breach with one or more specific merchants. The process implemented at steps 242 and 244 will be described in greater detail later in conjunction with FIG. 5. However, in FIG. 2B, at step 242, the remaining data records that have matching merchant and breach locations for all the unique PAN data records are then evaluated to look for common merchants (common-points-of purchase). As an example, referring to FIG. 3A, a common merchant (Acme Specialty—"Acme Spec") is found for transaction numbers 1, 6, 7, 9 and 10. This evaluation indicates that it is highly likely that the breach occurred at the merchant location (Dayton, Ohio) of Acme Specialty. While not illustrated in the example seen in FIG. 3A, there may be multiple merchant breach locations (in particular, when dump site data has come from multiple dump sites) determined at step 242. For this reason, and also to further confirm any identified breach, the system at step 244 continues the evaluation of all unique PAN data records until every wildcard data set has been resolved (i.e., every uniquely identified PAN has been associated with at least one breached merchant name). Once that is completed, then all merchant breach locations will have been identified for the uniquely matching records.

At step 248, the system 106 identifies and makes a record of both the merchants (merchant names and locations) that have been breached and each of the account numbers that are involved in the breach, step 248. This is accomplished by simply recording the merchant (name and location) that has been identified in step 242 and each PAN that is associated with a data record determined to be involved in a breach (at step 242).

It should be noted that when a transaction occurs at a breached merchant but is not associated with a wildcard data set, the transaction is likely to have occurred well before the breach and the time period of review, or well after the breach. More specifically, a transaction record may have been purged from the merchant system prior to the breach occurring (and thus was not vulnerable subject to the compromise), and there will be no merged data record corresponding to that transaction. Likewise, a transaction record (from the transaction database 130) may correspond to a transaction that occurred after the breach ended, and there will be no merged data record corresponding to the transaction. Each PAN associated with the data record determined to be involved in a breach is used to determine the "window of exposure," at step 250. Thus only transactions included in merged data records that identify breach locations at steps 240-248 are deemed to be within the "window of exposure," and PANs of data records outside that window are deemed not to have been compromised at step 250.

Referring to FIG. 2C (in conjunction with FIG. 3B), there is illustrated the evaluation of multiple PAN data records by the breach identifying system 106. It should be noted that many of the steps in FIG. 2C are similar to those in FIG. 2B, however the number of merged data records will be significantly greater (since many of the merged data records relate to accounts that are only one of many possible compromised accounts, as opposed to the unique PAN data records seen in FIG. 3A, which are virtually certain to have been compromised).

At step 260 each multiple PAN data record is first evaluated to determine whether there is a match of a merchant location to a breach location, similar to step 240 in FIG. 2B. This eliminates some merged data records from the evaluation, since any geographical locations that do not match are deemed not to have been breached. In the examples of multiple matched data records in FIG. 3B, transaction no. 6 would be eliminated for this reason.

At step 262, merchant names are then compared for matches (or common-points-of-purchase), similar to step 242 and FIG. 2B. However, in the case of multiple PAN data records, this is unlikely in of itself to identify a merchant location has been breached, since the accounts represented in a multiple PAN data records are only possibly breached accounts, rather than known breached accounts as in the process of FIG. 2B.

In the process of FIG. 2C, all merged data records having matched merchant names (or common-points-of purchase) are evaluated to determine the number of times (counts) that each merchant is identified, step 264. The greater the number of counts for a given merchant, the greater the likelihood that that merchant is in fact one that has been breached. For example, considering FIG. 3B, it can be seen that the three merchants Silver S, Mels B, and Acme Spec each have multiple counts. When the entirety of the multiple data records stored in database 150 for the period of review are considered, a likely breached merchant will have a much higher count relative to other merchants. For example, if after the elimination of multiple PAN data records at step 260, there are, say, 20,000 merged data records that are being considered, the counts for the three merchants Silver S, Mels B, and Acme Spec might be as follows:

| Merchant Count Table | |
|---|---|
| Merchant | Counts |
| Silver S | 957 |
| Mels B | 7 |
| Acme Spec | 1286 |

At step 266, the counts relative to one another are evaluated. In the specific example shown above, the merchants Silver S and Acme Spec are disproportionately higher than Mels B, and thus Silver S and Acme Spec are likely to be breached merchants, and Mels B is unlikely to be breached. This, of course, is only a simplified example, but as the number individual merged data records being considered increases, it will become evident that those that are likely to have been breached have counts significantly and disproportionately greater than those that have not been breached.

It should be noted that merchants having relatively small counts (such as Mels B in the example above) are very likely due to "spillover." Spillover occurs when a number of cards have been used at a breach merchant, but may have also been used at a different nearby merchant (i.e., two common-points-of-purchase). An example might be a card that has been breached at a large retailer in a shopping center, and some number of the card holders involved have also visited a second merchant in the same shopping center. Evaluating the counts in order to exclude merchants having a significantly lower number of counts significantly reduces the likelihood that the second merchant would mistakenly be seen as having been breached. This likelihood is reduced even further as more merchant data records are considered and the disparity in counts between breached merchants and other merchants becomes even more apparent.

The breach identifying system 106 can be programmed to recognize higher relative counts, such as by determining when one merchant has a count more than 10 or 20 times higher than another. Those merchants having the smallest counts are dropped and those having the highest counts are identified as being breached. It should be further understood that the breached merchants identified from the unique matches (FIG. 2B) can also be useful in this regard. For example, Acme Spec was a merchant identified as breached from the unique PANs stored in database 140, and thus it is likely that it would also be identified from the multiple PANs stored in database 150. In comparing counts at step 266, Acme Spec would be likely identified as having a higher count because of this. Other merchants, if any, having a count in a range similar to Acme Spec are likely to also have been breached, while those that have far lower counts might be excluded.

It should be appreciated that a large number of merged data records are being considered in this process, and similar to step 244 and FIG. 2B, the evaluation of multiple PAN data records and resulting merchant counts continues until the identified breached merchants become evident because of the likely disproportionate number of counts. As an example, once one or more merchants have a disproportionate number of counts relative to other merchants (and every wildcard can be associated with an account identified as having been breached), then the breach identifying system can stop its evaluation of merchant data records since, at this point, all wildcard data for the multiple PAN merged data records can be considered resolved, step 268.

At step 270, the system 106 identifies and make a record of both the merchant (name and location) that has been breached and each of the account numbers that are involved in the breach, step 270. Similar to step 248 FIG. 2B, this can be done by recording a merchant (name/location) that has been identified at step 266 and each PAN that is associated with the data record determined to be involved in the breach. At step 272, a window of exposure is determined, a manner similar to that discussed in connection with step 250, FIG. 2B.

Figure 4:
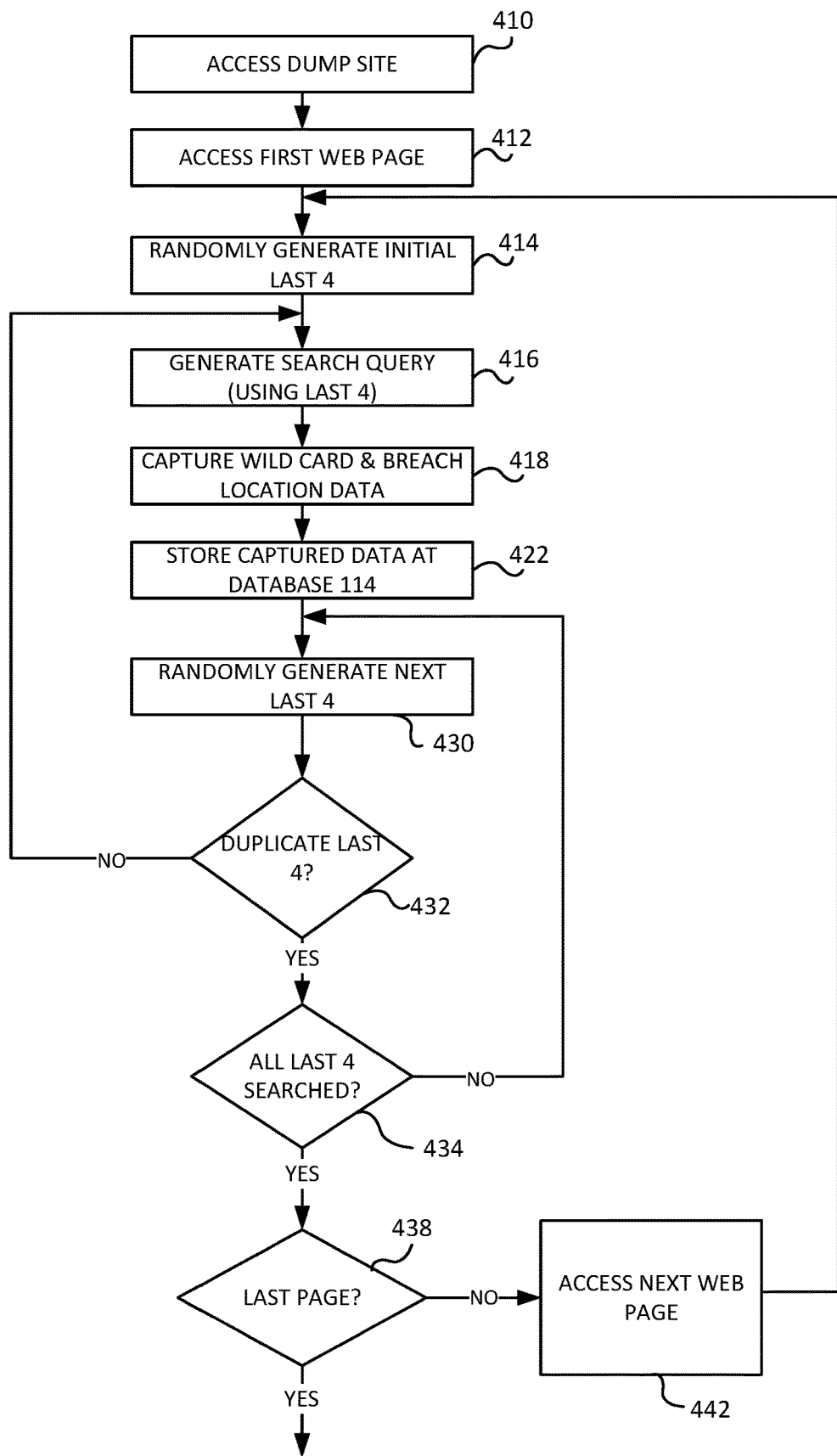
FIG. 4 illustrates a more detailed process for accessing dump sites in order to extract data to be stored in the extracted dump site data database.

FIG. 4 illustrates a programmed process implemented at extraction management system 102 for extracting data from a dump site, such as the dump site server 110 and dump database 112 illustrated in FIG. 1.

As mentioned earlier, a dump site may detect large amounts of data (dumps) being scraped when a web scraping program is used by the extraction management system 102. The system 102 executes a program for scraping data that is less likely to arouse suspicion. Generally, this is done by retrieving data associated with each set of Last 4 (last four digits of a PAN) in a random manner.

In the process of FIG. 4, the extraction management system 102 uses a search query at each page of the dump site. The pages of the dump site can be determined by creating a site map for the dump site (using a web crawler) or evaluating HTML tags at the site to identify where each webpage begins and ends. The search query may be facilitated if the dump site includes a search function, for example a search dialog box that is intended to be used by persons accessing the site to determine ranges of, e.g., BINs that may be preferred by the person purchasing the stolen account data.

Extraction management system 102 evaluates the dump site for creating a site map or identifying HTML tags when it accesses the site at step 410 (to determine where each web page begins and ends). The system then accesses the first page of the site at step 412, randomly generates an initial set of four digits (representing one possible Last 4) at step 414, and then generates a search query using the randomly generated four digits at step 416. If that first set of four digits does appear on the site as the Last 4 of a PAN, those four digits along with the associated BIN and expiration date (EXP) are captured as wildcard data at step 418 and (along with the captured breach location) are stored at the extracted database 114, step 422. The system then randomly generates the next Last 4 at step 430, makes sure that the next Last 4 is not a duplicate (and thus already been searched) at step 432, and then searches the first page again, repeating steps 416, 418 and 422. This process continues until all possible combination of Last 4 digits have been searched at step 434.

The system 102 then determines if the page examined is the last (or only) page at the site, step 438. If there are other pages (e.g., as determined at step 438), the system accesses the next page (step 442) and returns to step 414 (to generate an initial Last 4 for the next page), and generate another search query, step 416. This process continues until it is determined that the last page has been examined at step 438, at which time all wildcard (and associated) data has been captured and stored in the extracted database 114.

Figure 5:
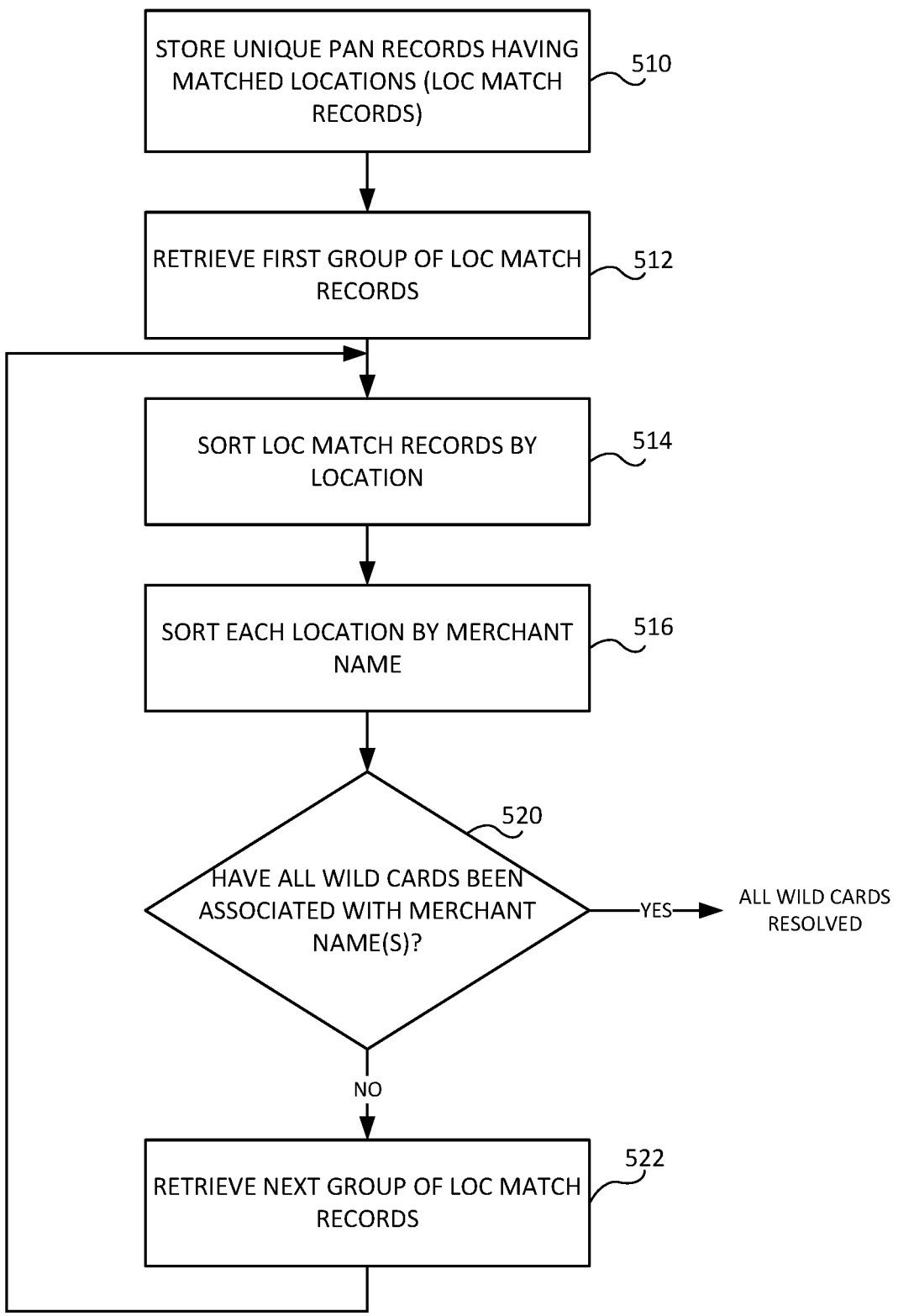
FIG. 5 is a detailed flow diagram illustrating a process for using unique PAN data to identify a merchant where a breach has occurred.

FIG. 5 illustrates a process for identifying specific card transactions associated with accounts that have been compromised, leading to the identification of a compromised merchant and account. The process of FIG. 5 relates to unique PAN data records, carried out within steps 242 and 244 of FIG. 2B. Is assumed, for purposes of describing FIG. 5, that unique PAN records have been filtered by breach identifying system 106, so that only merged data records having a determined common-point-of-purchase, i.e., a matching merchant location (geographical) and breach location (step 240, FIG. 2B), are being examined. Such data records (Loc Match) have been stored (step 510) in a separate storage location within database 140 after having been filtered or, alternatively, in a separate working memory accessible to the breach identifying system 106.

At step 512, a stored group of the unique PAN data records that have matching merchant and breach locations are retrieved. The first retrieved group may be chosen by the dates of transactions, to provide more efficient processing. For example, if all the transaction data available to the system 106 is the preceding 12 months, the first group may be the last month of preceding transactions (i.e., the month closest to the date of processing). As will be explained shortly, earlier months of data may be subsequently retrieved and processed until the merchant (and date of compromise) have been identified.

As discussed earlier, while in some cases there may be only a single breach involving the records (a breach at only one specific merchant system), there may also be multiple breaches being offered for sale at the dump site. To accommodate possible multiple breaches, the system 106 sorts retrieved data records by location, i.e., matching merchant and breach locations (step 514), so that data records having different matching locations are considered separately. For each different set of location matching records, the system then sorts by merchant name, step 516. It is assumed that this will identify a likely breach location associated with at least some of the data records (i.e., data records where not only locations match, but also merchant names match). However, the system will continue processing records until all wildcards have been resolved, at step 520, i.e., every wildcard can be associated with a specific transaction and merchant, where the merchant location and the breach location match. If not all wildcards have been resolved at step 520, the system 106 retrieves the next group of location matched records, step 522, and repeats steps 514, 516 and 520. Once all wildcards have been resolved at step 520, then the merchant name(s) associated with those wildcards are identified (step 248, FIG. 2B).

The process illustrated in FIG. 5 contemplates sizeable groups of records retrieved at steps 512 and 522 and then evaluated in groups until all wildcards have been resolved at step 520. However, it should be appreciated that smaller groups of merged data records can be retrieved and evaluated, and in some cases, even individual records incrementally received and evaluated against previously received records until all wildcards have been resolved at step 520.

Figure 6:
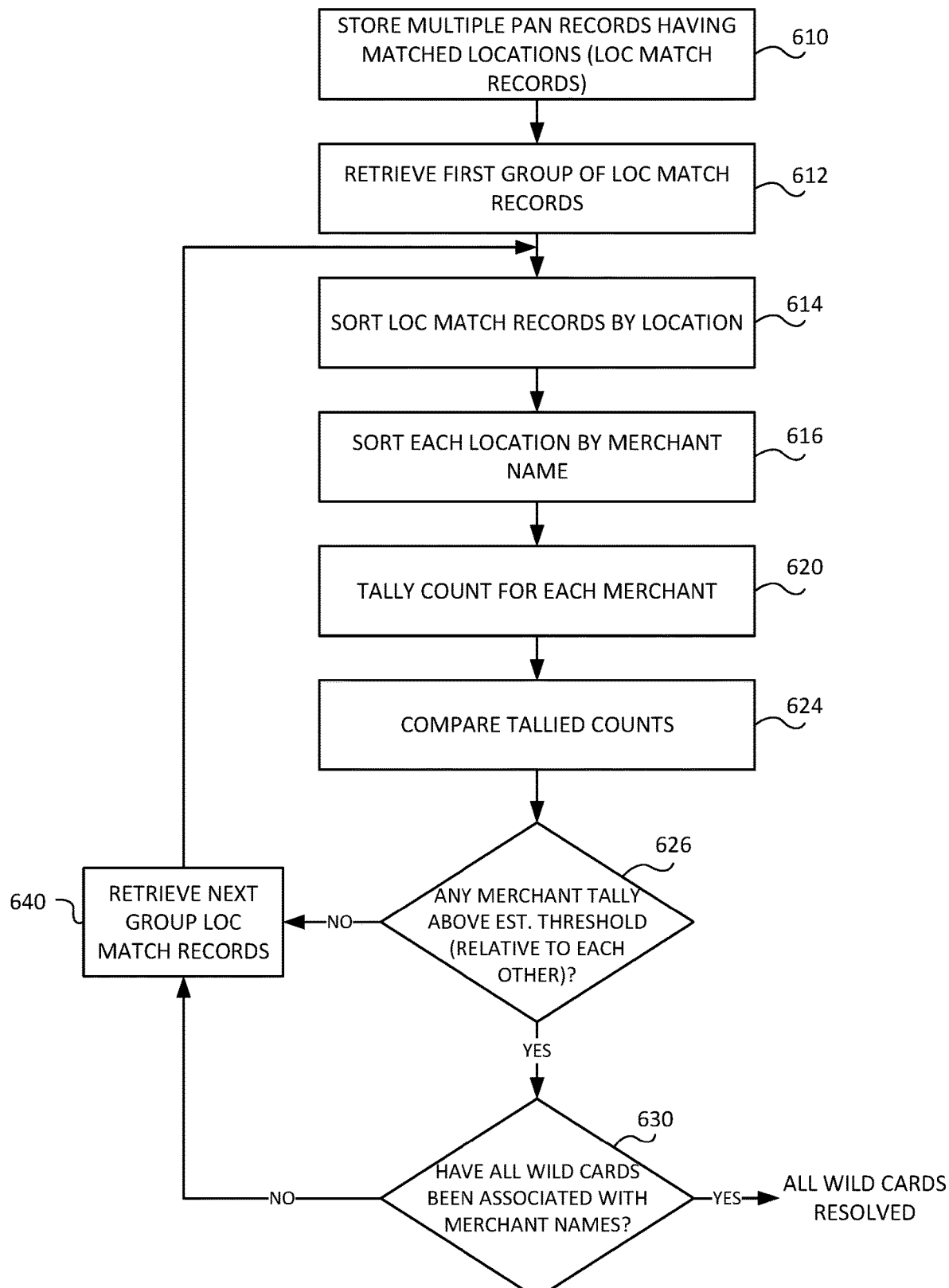
FIG. 6 is a detailed flow diagram illustrating a process for using multiple PAN data to identify a merchant where a breach has occurred.

FIG. 6 shows a process similar to that of FIG. 5, but such process relates to the processing of multiple PAN merged data records rather than unique PAN data records. As in FIG. 5, merged data records having a matched merchant location and breach location (common-point-of-purchase) are stored at step 610, and such matched data records (Loc Match) have a first group of records retrieved at step 612, then sorted by location at step 614, and sorted by merchant name at step 616. As discussed earlier in connection with FIG. 2C, each wildcard data matches multiple PAN data records (including PANs for accounts that have not been breached), and so at step 620 a tally will be made for the number or count of different merchants resulting from the sorting at step 616.

As described earlier in conjunction with FIG. 2C, the tallied counts are compared (step 624) in order to reveal disproportionate differences in counts. The comparison can be made in conjunction with established a predetermined thresholds for a disparity in counts, and when any merchant has a tally that is disproportionately greater in accordance with the established thresholds (step 626), that merchant will be deemed to have been breached. Those merchants that have disproportionately smaller counts will have corresponding data records excluded from consideration. Once a merchant (or multiple merchants) having disproportionately higher counts is identified at step 626, the system determines whether all wildcards have been resolved (i.e. all wildcards used in the multiple PAN data records have been associated with a breached merchant), step 630. If either a merchant has not been identified at step 626 or not all wildcards have not been resolved at step 630, then the next group of location matched records are retrieved at step 640, and steps 614-630 are repeated until all merchants have been identified at step 626 and all wildcards have been resolved at step 630.

Figure 7:
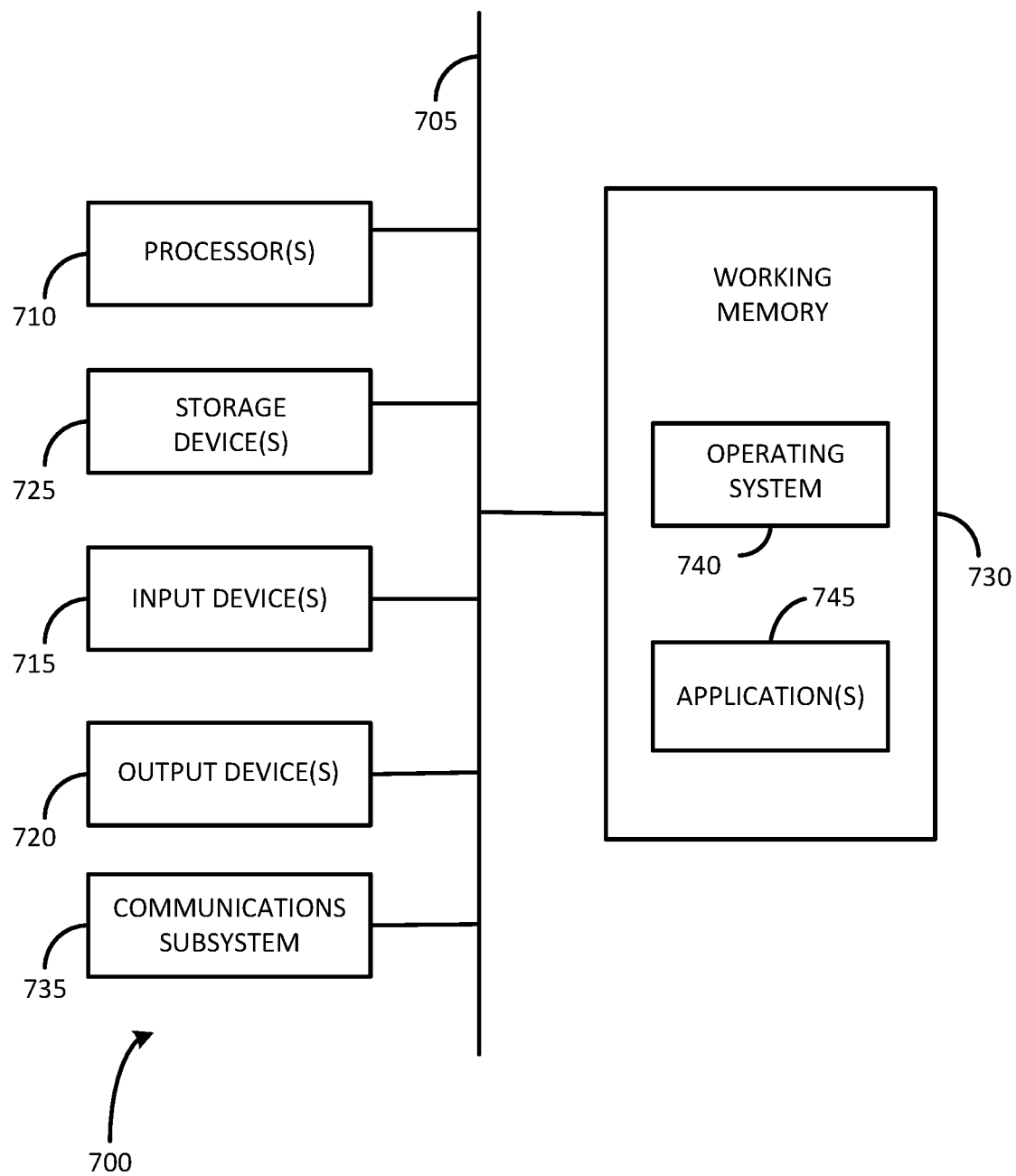
FIG. 7 is a block diagram illustrating an exemplary computer system, into which unique program features may be incorporated to provide a specially programmed computer that implements embodiments of the present invention.

FIG. 7 is a block diagram illustrating an exemplary computer system upon which embodiments of the present invention may be implemented. This example illustrates a computer system 700 such as may be used, in whole, in part, or with various modifications, and with software, as specially programmed systems that provide the functions of the extraction management system 102, multi-bank transaction data management system 104, and breach identifying system 106, as well as other components and functions of the invention described herein.

The computer system 700 is shown comprising hardware elements that can be electrically coupled or otherwise in communication via a bus 705. The hardware elements can include one or more processors 710 (such as digital signal processing chips, graphics acceleration chips, and/or the like); one or more input devices 715, which can include, without limitation, a mouse, a keyboard and/or the like; and one or more output devices 720, which can include, without limitation, a display device, a printer and/or the like.

The computer system 700 may further include one or more storage devices 725, which can comprise, without limitation, local and/or network accessible storage or memory systems having computer or machine readable media. Common forms of physical and/or tangible computer readable media include, as examples, a floppy disk, a flexible disk, hard disk, magnetic tape, or any other magnetic medium, an optical medium (such as CD-ROM), a random access memory (RAM), a read only memory (ROM) which can be programmable or flash-updateable or the like, and any other memory chip, cartridge, or medium from which a computer can read data, instructions and/or code. In many embodiments, the computer system 700 will further comprise a working memory 730, which could include (but is not limited to) a RAM or ROM device, as described above.

The computer system 700 also may further include a communications subsystem 735, such as (without limitation) a modem, a network card (wireless or wired), an infra-red communication device, or a wireless communication device and/or chipset, such as a Bluetooth® device, an 802.11 device, a WiFi device, a WiMax device, a near field communications (NFC) device, cellular communication facilities, etc. The communications subsystem 735 may permit data to be exchanged with a network, and/or any other devices described herein. Transmission media used by communications subsystem 735 (and the bus 705) may include copper wire, coaxial cables and fiber optics. Hence, transmission media can also take the form of waves (including, without limitation radio, acoustic and/or light waves, such as those generated during radio-wave and infra-red data communications).

The computer system 700 can also comprise software elements, illustrated within the working memory 730, including an operating system 740 and/or other code, such as one or more application programs 745, which may be designed to provide the unique computer functions implemented in the processes seen in FIGS. 2A-2C, and FIGS. 4-6, and thus provide specially designed and programmed device (e.g., extraction management system 102, multi-bank transaction data management system 104, and breach identifying system 106) for carrying out the unique elements and novel features described herein.

As an example, one or more methods discussed earlier might be implemented as code and/or instructions executable by a computer (and/or a processor within a computer). In some cases, a set of these instructions and/or code might be stored on a computer readable storage medium that is part of the system 700, such as the storage device(s) 725. In other embodiments, the storage medium might be separate from a computer system (e.g., a removable medium, such as a compact disc, etc.), and/or provided in an installation package with the instructions/code stored thereon. These instructions might take the form of code which is executable by the computer system 700 and/or might take the form of source and/or installable code, which is compiled and/or installed on the computer system 700 (e.g., using any of a variety of generally available compilers, installation programs, compression/decompression utilities, etc.). The communications subsystem 735 (and/or components thereof) generally will receive the signals (and/or the data, instructions, etc., carried by the signals), and the bus 705 then might carry those signals to the working memory 730, from which the processor(s) 705 retrieves and executes the instructions. The instructions received by the working memory 730 may optionally be stored on storage device 725 either before or after execution by the processor(s) 710.

While various functionalities are ascribed to certain individual system components, unless the context dictates otherwise, this functionality can be distributed or combined among various other system components in accordance with different embodiments of the invention. As one example, the systems 102, 104 and 106 may be each implemented by a single system having one or more storage device and processing elements, or may each be implemented by plural systems, with their respective functions distributed across different systems either in one location or across a plurality of linked locations.

Moreover, while the various flows and processes described herein (e.g., those illustrated in FIGS. 2A-2C and FIGS. 4-6) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A database system for storing data used in detecting breach of a computer system, comprising:
    a multi-institution database for storing transaction data relating to transactions conducted against accounts at multiple financial institutions;
    an extracted database for storing extracted data retrieved from dump sites where dump site data relating to compromised accounts is offered for sale over the Internet, the extracted data including at least (1) sets of wildcard data that each only partially identifies a primary account number (PAN) of a compromised account and (2) compromise location data identifying a location of compromise, wherein the extracted data is retrieved from a dump site by searching each web page of the dump site with randomly generated four digits in order to identify the last four digits of a PAN associated with a compromised account, and thereby retrieve wildcard data that includes the last four digits of the PAN associated with the compromised account;
    a unique PAN database for storing a unique PAN data set, the unique PAN data set received from a breach identifying system; and
    a multiple PAN database for storing a multiple PAN data set, the multiple PAN data set received from the breach identifying system;
    wherein the breach identifying system:
        retrieves (1) transaction data stored at the multi-institution database and associated with transactions conducted against accounts maintained at the multiple financial institutions, the transaction data including merchant name data identifying a name of a merchant associated with a corresponding transaction and merchant location data identifying a location of the merchant and (2) extracted data stored at the extracted database,
        merges the transaction data and extracted data into the unique PAN data set and the multiple PAN data set that include a plurality of data records that each correspond to a transaction, with the unique PAN data set including, for each data record, transaction data for the corresponding transaction and extracted data associated with an account that is uniquely identified by the wildcard data and that is used for the corresponding transaction, and the multiple PAN data set including, for each data record, transaction data for the corresponding transaction and extracted data associated with one of multiple different accounts that are all identified by the wildcard data, with one of the multiple different accounts used for the corresponding transaction, and
        identify a merchant where a breach has occurred and transmit a notification to the merchant including an indication of the breach.

2. The database system of claim 1, wherein the wildcard data comprises a bank identification number (BIN) associated with the compromised account, the last four digits of the PAN associated with the compromised account, and an expiration date for a card associated with the compromised account, and wherein the compromise location data identifies a city associated with a location where a system was breached by a hacker to obtain data associated with the compromised account.

3. The database system of claim 1, wherein a common point-of-purchase is determined from the unique PAN data set in the unique PAN database and from the multiple PAN data set in the multiple PAN database, and wherein the determined common-point-of-purchase is used to identify a merchant where a breach has occurred and accounts that have been compromised.

4. The database system of claim 3, wherein the common point-of-purchase is determined by comparing, for each data record, the merchant location data and the compromise location data.

5. The database system of claim 4, wherein a data record not having the same merchant location data and compromise location data is removed from further evaluation in determining the common-point-of-purchase, with only data records having matched merchant location data and compromise location data remaining for further evaluation.

6. The database system of claim 5, wherein the common-point-of-purchase is further determined from the unique PAN data set in the unique PAN database and from the and the multiple PAN data set in the multiple PAN database by sorting, by merchant name data, data records having matched merchant location data and compromise location data remaining for further evaluation.

7. The database system of claim 6, wherein the data records are successively evaluated for determining the common-point of purchase and thereby identify a merchant where a breach has occurred, until every wildcard data in the data records is associated with an identified merchant.

8. The database system of claim 1, wherein the randomly generated last four digits are generated by an extraction management system.

9. The database system of claim 8, wherein the randomly generated four digits are generated in succession by the extraction management system until all possible last four digits have been searched at each web page of the dump site.

10. A data breach detection system, comprising:
    an extraction management system for accessing dump sites where dump site data relating to compromised accounts is offered for sale over the Internet, for retrieving extracted data from the dump site data, the extracted data including at least (1) wildcard data that only partially identifies a primary account number (PAN) of a compromised account, and (2) compromise location data identifying the location of the compromise, and for storing the extracted data at an extracted database, wherein the retrieving of extracted data from the dump site comprises searching each web page of the dump site with randomly generated four digits in order to identify the last four digits of the PAN associated with the compromised account, and thereby retrieve wildcard data that includes the last four digits of the PAN associated with the compromised account;

a breach identifying system for:

retrieving (1) transaction data pertaining to transactions conducted against accounts maintained at a plurality of financial institutions, the transaction data including merchant name data identifying the name of a merchant associated with the transaction and merchant location data identifying the location of the merchant and (2) extracted data stored at the extracted database, and merging the transaction data and extracted data into two merged data sets, each having a plurality of data records that each correspond to a transaction, the data sets including a first, unique account data set which includes, for each data record, transaction data for the corresponding transaction and extracted data associated with an account that is uniquely identified by the wildcard data and used for the corresponding transaction, and a second, multiple account data set which includes, for each data record, transaction data for the corresponding transaction and extracted data associated with one of multiple different accounts that are all identified the wildcard data;

storing the first, unique account data set in a unique PAN database;

storing the second, multiple account data set in a multiple PAN database;

determining a common-point-of-purchase from the first, unique account data set in the unique PAN database;

determining a common-point-of-purchase from the second, multiple account data set in the multiple PAN database;

using the determined common-point-of-purchase from the first, unique account data set in the unique PAN database and the second, multiple account data set in multiple PAN database to identify a merchant where a breach has occurred and accounts that have been compromised; and notifying the merchant where the breach has occurred.

11. The system of claim 10, wherein the wildcard data comprises a bank identification number (BIN) associated with the compromised account, the last four digits of the PAN associated with the compromised account, and an expiration date for a card associated with the compromised account, and wherein the compromise location data identifies a city associated with a location where a system was breached by a hacker to obtain data associated with the compromised account.

12. The system of claim 10, wherein a common point-of-purchase is determined from the unique PAN data set in the unique PAN database and from the multiple PAN data set in the multiple PAN database, and wherein the determined common-point-of-purchase is used to identify a merchant where a breach has occurred and accounts that have been compromised.

13. The system of claim 10, wherein the common point-of-purchase from the first, unique account data set in the unique PAN database and from the second, multiple account data set in the multiple PAN database is identified by comparing, for each data record, the merchant location data and the compromise location data.

14. The system of claim 13, wherein a data record not having the same merchant location data and compromise location data is removed from further evaluation in determining a common-point-of-purchase, with only data records having matched merchant location data and compromise location data remaining for further evaluation.

15. The system of claim 14, wherein a common-point-of-purchase is further determined from the first, unique account data set in the unique PAN database and from the second, multiple account data set in the multiple PAN database by sorting, by merchant name data, data records having matched merchant location data and compromise location data remaining for further evaluation.

16. The system of claim 15, wherein the data records are successively evaluated for determining the common-point of purchase and thereby identify a merchant where a breach has occurred, until every wildcard data in the data records is associated with an identified merchant.

17. The system of claim 10, wherein the randomly generated last four digits are generated by the extraction management system.

18. The system of claim 17, wherein the randomly generated four digits are generated in succession until all possible last four digits have been searched at each web page of the dump site.

* * * * *